United States Patent Office 3,033,820
Patented May 8, 1962

---

3,033,820
HIGH MOLECULAR WEIGHT RESINS
Herbert P. Price and William J. Belanger, Louisville, Ky., assignors to Devoe & Raynolds Company, Inc., Louisville, Ky., a corporation of New York
No Drawing. Filed Oct. 24, 1958, Ser. No. 769,316
12 Claims. (Cl. 260—47)

This invention relates to the production of polymeric reaction products from chlorhydrin ethers of hydroxyalkyl and hydroxy-aliphatic ethers of dihydric phenols and includes improved processes of producing such polymeric products and the improved products resulting therefrom.

The invention includes the production of polymeric dehydrohalogenation reaction products of such chlorohydrin ethers which are themselves polymeric chlorohydrin ethers containing both chlorohydrin and phenolic hydroxyl groups, and polymeric dehydrohalogenation reaction products which are substantially free from both chlorohydrin and epoxide groups.

The invention also includes modifications of the polymeric process and products, carried out in a single stage or in two successive stages, in which epichlorohydrin is used in admixture with the chlorohydrin ethers at the outset of the process or for reaction with polymeric chlorohydrin ethers in the second stage of the process.

The polymeric reaction is one which is carried out with the use of a dehydrohalogenating agent to effect self-condensation of the monochlorohydrin ethers of the monohydroxyalkyl ethers of dihydric phenols.

The hydroxyalkyl or hydroxy-aliphatic ethers of dihydric phenols, from which the chlorohydrin ethers are prepared, can be readily prepared by reacting 1 mol of dihydric phenol with 1 mol of a simple or substituted alkyl or aliphathic chlorohydrin, using sodium hydroxide as the condensing or dehydrohalogenating agent; or by reacting 1 mol of dihydric phenol with 1 mol of a simple or substituted alkyl or aliphatic carbonate using potassium carbonate as the catalyst; or by reacting 1 mol of dihydric phenol with 1 mol of a simple or substituted aliphatic monoepoxide.

The formation of the hydroxyalkyl or hydroxyaliphatic ethers of a dihydric phenol is illustrated by the following equation, in which R is the aromatic nucleus of the dihydric phenol and R' is the radical of the simple or substituted alkyl group, including alkylether substituted alkyl groups, and which may be defined as a simple or substituted aliphatic divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups:

$$HO-R-OH + ClR'OH \xrightarrow{NaOH} HO-R-O-R'OH + NaCl$$

Examples of the hydroxyalkyl ethers are the hydroxyethyl ether of the dihydric phenol, such as bisphenol, in which R' is the —CH$_2$CH$_2$— group, which can readily be prepared by the reaction of ethylene chlorhydrin with a dihydric phenol with the use of caustic soda as the dehydrohalogenating agent. The use of glyceryl monochlorohydrin gives a hydroxy alkylether in which R' is the

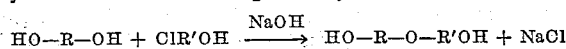

group, this being the dihydroxypropyl ether of the dihydric phenol.

In a similar manner, the use of other aliphatic chlorohydrins can be used to give other hydroxyalkyl or substituted hydroxyalkyl ethers of the dihydric phenols.

The dihydroxypropyl ether of the dihydric phenol can also be prepared by reacting 1 mol of the dihydric phenol with 1 mol of glycidol. And other monoepoxides can be similarly used to produce other hydroxyalkyl and substituted hydroxyalkyl derivatives. Thus, the use of phenylglycide ether for reacting with the dihydric phenol gives a product in which the group R' in the above formula is

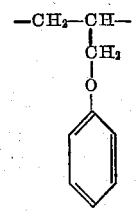

In this case, the alkyl group has a hydrocarbon ether substitutent. Other simple or substituted hydroxyalkyl derivatives can be produced by the use of other monoepoxides such as ethylene oxide, butylglycidyl ether, isopropylglycidyl ether, styrene oxide, etc.

In addition to the simple and substituted hydroxyalkyl ethers, substituted in the alkyl group, somewhat more complex hydroxyalkyl or hydroxy-aliphatic derivatives of the dihydric phenols can be produced by reacting 1 mol of the dihydric phenol with the monochlorohydrin ether of a mono-, di-, or trihydric alcohol, or by reacting 1 mol of the dihydric phenol with 1 mol of a monoglycide ether such as the monoglycide ethers of di-, tri-, or higher polyhydric alcohols. For example, 1 mol of the monoglycide ether of trimethylol propane can be reacted with 1 mol of a dihydric phenol such as bisphenol to form the corresponding hydroxy-containing monoether. Or 1 mol of the monochlorohydrin ether of trimethylol propane can be reacted with 1 mol of a dihydric phenol such as bisphenol to form the hydroxy-containing monoether. The resulting hydroxyalkyl or hydroxy-aliphatic ether of the dihydric phenol in this case will have a formula in which R' is the following group:

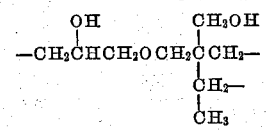

The hydroxyalkyl or hydroxy-aliphatic ethers of the dihydric phenols have both alcoholic hydroxyl and phenolic hydroxy groups.

The monochlorohydrin ethers are produced by reacting 1 mol of the hydroxyalkyl ether or of the hydroxyaliphatic ether of the dihydric phenol with 1 mol of epichlorohydrin in the presence of a condensation catalyst, and particularly a BF$_3$ catalyst such as a boron trifluoride ether complex or etherate, to form the chlorohydrin ether. This reaction of epichlorohydrin is with the alcoholic hydroxyl group, or with one of the alcoholic hydroxyl groups, leaving the phenolic hydroxyl group largely unreacted. This reaction is illustrated by the following equation, in which R and R' have the same meaning above indicated:

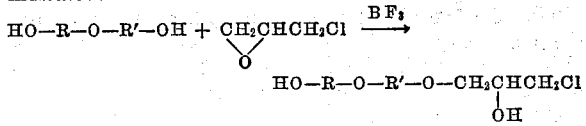

By subjecting such chlorohydrin ethers to the action of a dehydrohalogenating agent, such as an aqueous solution of caustic alkali, the chlorohydrin ether is dehydrohalogenated and a polymeric product formed through reaction of the epoxide group formed from the chlorohydrin with the phenolic group of another molecule.

When the monochlorohydrin ether is subjected to dehydrohalogenation, the product formed will depend upon the amount of dehydrohalogenating agent used. One mol of dehydrohalogenating agent such as caustic soda is required for each mol of chlorohydrin which is to be dehydrohalogenated. By using less dehydrohalogenating agent than required for complete dehydrohalogenation, a polymeric product is produced which still contains chlorohydrin groups as well as terminal phenolic hydroxyl groups. Thus, if $x+1$ mols of a monochlorohydrin ether are dehydrohalogenated with $x$ mols of caustic alkali as the dehydrohalogenating agent, polymeric products are produced, typically illustrated by the following formula:

(A) 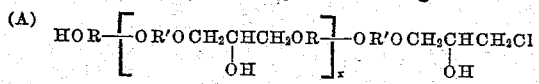

in which R and R' have the meaning previously described, $x$ the mols of caustic alkali used as a dehydrohalogenating agent, and $x+1$ the number of mols of monochlorohydrin ether reacted.

When the amount of dehydrohalogenating agent is equal to the number of mols of monochlorohydrin ether, a polymeric product is produced which, in the lower stages of polymerization, contains a terminal epoxide group at one end and a phenolic hydroxyl group at the other, as typically indicated by the following formula, in which R and R' have the meaning above indicated and which is produced by the use of $x+1$ mols of the monochlorohydrin ether and of caustic alkali as the dehydrohalogenating agent:

(B) 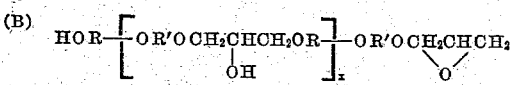

While the polymerization tends to go to an indefinite length, the molecular weight stays in a workable range, due to decreased functionality caused by the presence of inactive chlorine.

By the addition of epichlorohydrin to the monochlorohydrin ether, before subjecting it to dehydrohalogenation, the polymerization of the monochlorohydrin ether with itself can be regulated and limited, and epoxide resins produced of intermediate molecular weight or of varying molecular weight, depending upon the proportions of epichlorohydrin and of monochlorohydrin ether used.

The simplest reaction product in this case results from the reaction of 1 mol of epichlorohydrin with 1 mol of the monochlorohydrin ether to give a product having the following formula:

(C) 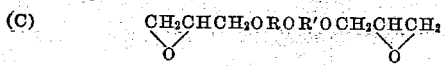

This product, however, is not a polymeric product, and polymeric products are also produced with the use of 1 mol of epichlorohydrin per mol of monochlorohydrin ether, as well as when less than 1 mol of epichlorohydrin is used. Thus, the use of 1 mol of epichlorohydrin with $x+1$ mols of monochlorohydrin ether and $x+2$ mols of caustic alkali as the dehydrohalogenating agent gives a product typically indicated by the following formula:

(D) 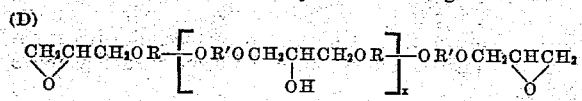

Instead of adding the epichlorohydrin at the outset, the monochlorohydrin ether can be subjected to self-polymerization with less than the required amount of dehydrohalogenating agent to form a polymeric chlorohydrin ether, as indicated in (A) above, and this can further be reacted, in a second step of the process, with the addition of epichlorohydrin and with dehydrohalogenation to give products such as typically illustrated in Formula D above.

In carrying out the dehydrohalogenation, the amount of dehydrohalogenating agent used will depend upon whether an incomplete dehydrohalogenation is desired in the first step of the two-step process to produce a product such as illustrated by Formula A above, or whether complete dehydrohalogenation is desired. To effect complete dehydrohalogenation of the chlorohydrin ether to form the polymeric product, or of both the chlorohydrin ether and the epichlorohydrin, the amount of dehydrohalogenating agent should be sufficient to combine with all of the active chlorine and is advantageously somewhat in excess of this amount.

In practice, the reactions are somewhat more complex and the products produced are somewhat more complex than indicated by the above formulas. But the formulas indicate products which are formed in the different methods and present among the principal products of the respective reactions. Thus, where some of the chlorine present is inactive chlorine, this will result in a modification of the reaction and the production of products having a somewhat modified structure.

Different alkaline dehydrohalogenating agents can be used, including alkali metal complexes and salts such as sodium silicate, sodium aluminate, sodium zincate, etc. A solution of caustic alkali is advantageously used in carrying out the process.

The monochlorohydrin ethers used can vary both in the dihydric phenol from which they are formed and in the alkyl group of the chlorohydrin ether. Dihydric phenols such as are used in forming epoxide resins by reaction with epichlorohydrin in the presence of caustic alkali can be used as the dihydric phenols, including resorcinol, hydroquinone, bisphenol (p,p'dihydroxy diphenyl dimethyl methane) etc.

Different unsubstituted and substituted hydroxyalkyl ethers of dihydric phenols can be used in making the monochlorohydrin ethers and the final diglycidyl ethers, varying both in the dihydric phenol used and in the hydroxyalkyl or hydroxy-aliphatic ether groups, as previously indicated. The hydroxyethyl ethers of dihydric phenols, such as bisphenol, are particularly advantageous; but higher mono- or polyhydroxyalkyl ethers can be used, such as the hydroxypropyl and hydroxybutyl ethers, and including substituted as well as unsubstituted hydroxyalkyl and hydroxy-aliphatic ethers.

The proportions of epichlorohydrin and of the monochlorohydrin ether, when epichlorohydrin is used in carrying out the process, can be varied, but in general will not be more than 1 mol of epichlorohydrin per mol of monochlorohydrin ether. With 1 mol of epichlorohydrin and 1 mol of monochlorohydrin ether and 2 mols of alkali, the dehydrohalogenation tends to produce to some extent a monomeric product such as illustrated in Formula C, which is the diglycide ether of the monohydroxy alkyl ether of the dihydric phenol. But this product is produced in admixture with polymeric products. And the extent of the polymerization of the chlorohydrin ether with itself on dehydrohalogenation can be regulated and controlled by the proportion of epichlorohydrin used. Thus, with 1 mol of epichlorohydrin with 2 mols or 3 mols of the monochlorohydrin ether, low molecular weight epoxide resins are produced. With a larger number of mols of monochlorohydrin ether up to 5 or 10 or more per mole of epichlorohydrin, higher melting point epoxide resins are produced with a high degree of polymerization.

Similarly, when carrying out the two-step process in which the monochlorohydrin ether is first subjected to dehydrohalogenation with less than the amount of dehydrohalogenating agents required, products of varying melting point and molecular weights can be produced by varying the extent of the polymerization to produce the polymeric chlorohydrin ether in the first step, which is then admixed with epichlorohydrin and subjected to dehydrohalogenation in the second step of the process.

Where the dehydrohalogenation is carried out without the addition of epichlorohydrin and with the use of sufficient dehydrohalogenating agent to effect substantially complete dehydrohalogenation, high molecular weight resins are produced which are free or substantially free from epoxide groups.

And where the dehydrohalogenation is carried out without the addition of epichlorohydrin and with less dehydrohalogenating agent than required for complete dehydrohalogenation, polymeric chlorohydrins can be produced varying in molecular weight and melting point. For example 3 mols of the monochlorohydrin ether above referred to can be reacted with 2 mols of alkali as the dehydrohalogenating agent, to produce a new monochlorohydrin polyether containing 1 chlorohydrin ether group and 1 phenolic hydroxyl group, such as typically illustrated in Formula A above, where $x$ equals 2.

In general, in such a two-step process, the degree of polymerization of the polymeric monochlorohydrin ether can be regulated by the proportions of monochlorohydrin ether and caustic alkali used as dehydrohalogenating agent, using $x$ mols of caustic alkali for $x+1$ mols of monochlorohydrin ether to produce the polymeric monochlorohydrin polyether. This polyether can then be reacted with 1 mol of epichlorohydrin and 2 mols of alkali to produce the diglycide ethers such as typically illustrated in Formula D above.

Polymeric diglycide ethers of the monochlorohydrin polyethers result from the use of less than 1 mol of epichlorohydrin per mole of monochlorohydrin polyether; the proportions in this respect being similar to the proportions of epichlorohydrin to monochlorohydrin ether when the process is carried out as a one-step process, and where the degree of polymerization is regulated by the use of varying fractions of 1 mol of epichlorohydrin per mol of monochlorohydrin ether.

The hydroxyalkyl and hydroxy aliphatic ethers of the dihydric phenols can readily be prepared as previously described.

The conversion of the monohydroxyalkyl and hydroxy aliphatic ethers into the monochlorohydrin derivatives is effected by reaction with epichlorohydrin in the presence of a condensation catalyst such as a boron trifluoride ether complex or etherate.

The product of such hydroxyalkyl and hydroxy aliphatic ethers of dihydric phenols and their conversion into monochlorohydrin derivatives is described in more detail in our companion applications Serial Nos. 769,317 and 769,284, both filed on October 24, 1958.

In the monochlorohydrin ethers, most of the chlorine is active chlorine but some small amount is usually present as inactive chlorine. These terms, as used in the following examples, are defined as follows:

The active chlorine is defined as the chlorine on a carbon atom adjacent to a carbon atom containing a hydroxyl group, as follows:

(1) 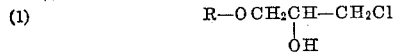

This compound is easily dehydrohalogenated to give an epoxide compound.

Inactive chlorines are formed by the addition of epichlorohydrin to the hydroxyl group in the above compound.

(2) 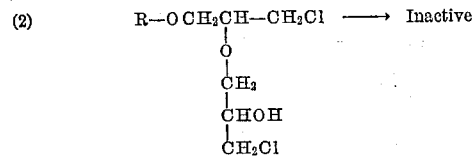

The above labeled chlorine cannot be removed to form an epoxide group since no hydroxyl is present on an adjacent carbon.

The invention will be further illustrated by the following specific examples, but it will be understood that the invention is not limited thereto.

Examples 1 and 2 illustrate the self-condensation of the chlorohydrin with itself to produce a high molecular weight resin which is a polyhydric alcohol.

Example 1

To a 2 liter flask equipped with stirrer, condenser, and thermometer was added 509 grams (1.4 mols, theoretically) of the monochlorohydrin ether of the hydroxyethyl ether of bisphenol formed by reacting 1 mol bisphenol and 1 mol ethylene oxide. To this was added 56 grams (1.4 mols) of NaOH dissolved in 500 cc. of water. The temperature was raised to reflux and held there for thirty minutes. The taffy resin was then washed with boiling water, until neutral to pH paper. The product was dried by heating to 150° C. The resin, recovered in 98% yield (448 grams) had no epoxy content, total chlorine of 2.3%, and active chlorine of 0.75%. The Durran's melting point was 80° C., Gardner viscosity J (40% N.V. in butyl Carbitol).

Example 2

Using the same procedure and equipment as described in Example 1, the following recipe was used to prepare a resin with the listed properties: monochlorohydrin ether of the hydroxy propyl ether of resorcinol formed by condensing 1 mol of propylene oxide and 1 mol of resorcinol 555 grams (2.13 mols), NaOH 95 grams (2.13 mols+10 wt. percent excess) and water 750 cc. The product was prepared with a yield (408 grams) of 86%, no epoxy content, total chlorine of 3.7%, active chlorine of 1.1%, Gardner viscosity G–H, and Durran's melting point 52° C.

Examples 3 and 4 illustrate the production of epoxide resins with the addition of epichlorohydrin to the monochlorohydrin ethers before dehydrohalogenation.

Example 3

This resin is the reaction product of 2 mols of the monochlorohydrin ether of the hydroxy ethyl ether of bisphenol and 1.2 mols of epichlorohydrin. To a 2 liter flash equipped as in Example 1 was added 632 grams (1.73 mols) of the chlorohydrin ether. To this was added 109 grams of NaOH (2.72 mols+5% excess) dissolved in 750 ml. of water and 96 grams (1.04 mols) of epichlorohydrin. The temperature was raised to 100° C. and held there for 30 minutes. The taffy resin was washed with boiling water until neutral to pH paper and dried by heating to 150° C. The product in 98% yield (632 grams) had a weight/epoxide of 689, total chlorine 2.3%, active chlorine 0.4%, Durran's M.P. 56° C., Gardner viscosity D.

Example 4

This resin is the reaction product of 4 mols of the monochlorohydrin ether of the hydroxy ethyl ether of bisphenol and 1.2 mols of epichlorohydrin. The procedure and equipment was the same as Example 3. The following recipe was used to prepare a resin with the listed properties; chlorohydrin ether of the hydroxy ethyl ether of bisphenol 181 grams (0.496 mol), epichlorohydrin 14 grams (0.149 mol), NaOH 33 grams (0.825 mol, 10% excess), water 500 ml. The product was prepared with a yield (161 grams) of 95%, weight/epoxide 1,270, total chlorine of 2.3%, active chlorine of 0.7%, Durran's M.P. 64° C. and Gardner viscosity (40% N.V. in butyl Carbitol) F.

In a similar manner monochlorohydrin ethers of other hydroxyalkyl and hydroxy-aliphatic ethers of dihydric phenols, such as those hereinbefore referred to and illustrated by the general formula hereinbefore given, can be dehydrohalogenated in the presence of epichlorohydrin to form epoxide resins.

The products produced by self-condensation without the addition of epichlorohydrin are long chain, high molecular weight polyhydric alcohols which are useful for various purposes, including esterification to a greater or less extent with drying oil or other acids to form drying esters or other esters, or by reaction with cross-linking agents, which cross-link between hydroxyl groups, such as diisocyanates, amine aldehyde or phenol aldehyde resins, to form complex or insoluble products.

The epoxide resins produced when epichlorohydrin is also present in the production of the resins are valuable epoxide resins and are distinguished from epoxide resins made from dihydric phenols and epichlorohydrin by their content of aliphatic groups which impart desirable properties for various resin purposes.

The epoxide resins can be used in making films or coating compositions and can be cured with amine or other curing agents such as are used in the curing of epoxide resins.

We claim:

1. The method of producing high molecular weight polymeric products which comprises subjecting monochlorohydrin ethers of monohydroxy-aliphatic ethers of a dihydric phenol having the following general formula

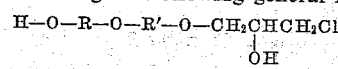

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, to dehydrohalogenation with an alkaline dehydrohalogenating agent.

2. The method of producing high molecular weight epoxide resins which comprises subjecting monochlorohydrin ethers of monohydroxy-aliphatic ethers of a dihydric phenol having the following formula

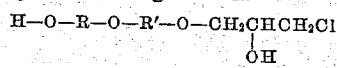

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, to dehydrohalogenation with an alkaline dehydrohalogenating agent in admixture with added epichlorohydrin in the proportion of not more than 1 mol of epichlorohydrin per mol of monochlorohydrin ether.

3. The two-step process of producing high molecular weight epoxide resins which comprises subjecting monochlorohydrin ethers of monohydroxy-aliphatic ethers of a dihydric phenol having the following formula

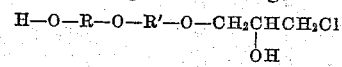

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, to dehydrohalogenation with an alkaline dehydrohalogenating agent insufficient to effect complete dehydrohalogenation, adding epichlorohydrin to the resulting polymeric chlorohydrin product and subjecting the mixture to dehydrohalogenation with sufficient alkaline dehydrohalogenating agent to effect substantially complete dehydrohalogenation of active halogen.

4. The method of producing high molecular weight polymeric products which comprises subjecting a monochlorohydrin ether of a monohydroxyethyl ether of a dihydric phenol to dehydrohalogenation with an alkaline dehydrohalogenating agent.

5. The method of producing high molecular weight epoxide resins which comprises subjecting a monochlorohydrin ether of a monohydroxyethyl ether of a dihydric phenol to dehydrohalogenation with an alkaline dehydrohalogenating agent in the presence of added epichlorohydrin in the proportion of not more than 1 mol of epichlorohydrin per mol of monochlorohydrin ether.

6. The two-step process of producing high molecular weight epoxide resins which comprises subjecting a monoclorohydrin ether of a monohydroxyethyl ether of a dihydric phenol to dehydrohalogenation with an alkaline dehydrohalogenating agent insufficient to effect complete dehydrohalogenation, adding epichlorohydrin to the resulting polymeric chlorohydrin product and subjecting the mixture to dehydrohalogenation with sufficient alkaline dehydrohalogenating agent to effect substantially complete dehydrohalogenation of active halogen.

7. Products produced in accordance with the process of claim 1.

8. Products produced in accordance with the process of claim 2.

9. Products produced in accordance with the process of claim 3.

10. Products produced in accordance with the process of claim 4.

11. Products produced in accordance with the process of claim 5.

12. Products produced in accordance with the process of claim 6.

References Cited in the file of this patent

UNITED STATES PATENTS

| | | |
|---|---|---|
| 2,538,072 | Zech | Jan. 16, 1951 |
| 2,581,464 | Zech | Jan. 8, 1952 |